United States Patent
Weaver

(10) Patent No.: US 10,287,169 B2
(45) Date of Patent: May 14, 2019

(54) LEACHING ULTRAHARD MATERIALS BY ENHANCED DEMETALYZATION

(71) Applicant: Halliburton Energy Services, Inc., Houston, TX (US)

(72) Inventor: Gary E. Weaver, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/034,532

(22) PCT Filed: Dec. 9, 2013

(86) PCT No.: PCT/US2013/073868
§ 371 (c)(1),
(2) Date: May 4, 2016

(87) PCT Pub. No.: WO2015/088475
PCT Pub. Date: Jun. 18, 2015

(65) Prior Publication Data
US 2016/0280552 A1    Sep. 29, 2016

(51) Int. Cl.
*C23G 1/02* (2006.01)
*C21B 15/00* (2006.01)
(Continued)

(52) U.S. Cl.
CPC ............ *C01B 32/28* (2017.08); *C04B 41/009* (2013.01); *C04B 41/5353* (2013.01);
(Continued)

(58) Field of Classification Search
CPC . C01B 31/065; C23F 1/00; C23F 1/28; C22C 26/00; C22C 1/1094; C04B 41/009; C04B 41/91; C04B 41/5353
(Continued)

(56) References Cited

U.S. PATENT DOCUMENTS 4,288,248 A    8/1981  Bovenkerk et al.
4,381,249 A    4/1983  Bouffard
(Continued)

FOREIGN PATENT DOCUMENTS

CN    1630917 A    6/2005
CN    103290247    9/2013
GB    2465175    5/2010

OTHER PUBLICATIONS

International Search Report and Written Opinion, Application No. PCT/US2013/073868, 10 pages, dated Sep. 3, 2014.
(Continued)

*Primary Examiner* — Nadine G Norton
*Assistant Examiner* — Christopher Remavege
(74) *Attorney, Agent, or Firm* — Baker Botts L.L.P.

(57) ABSTRACT

The present disclosure relates to methods for enhanced demetalyzation of an ultrahard material, such as polycrystalline diamond (PCD) or cubic boron nitride (CBN), using a thiourea solution. The thiourea solution may contain thiourea and an acid, such as a Bronstead acid suitable for leaching. The thiourea may contain thiourea or a substituted thiourea, including tautomers thereof. The ultrahard material may be exposed to the thiourea solution for a time and under conditions sufficient to remove at least a desired amount of a metal, such as a catalyst used during formation of the PCD or CBN, from at least a portion of the ultrahard material.

20 Claims, 1 Drawing Sheet

(51) Int. Cl.
*C01B 32/28* (2017.01)
*C04B 41/91* (2006.01)
*C04B 41/00* (2006.01)
*C04B 41/53* (2006.01)
*C22C 1/10* (2006.01)
*C22C 26/00* (2006.01)
*C23F 1/28* (2006.01)

(52) U.S. Cl.
CPC ............ *C04B 41/91* (2013.01); *C22C 1/1094* (2013.01); *C22C 26/00* (2013.01); *C23F 1/28* (2013.01)

(58) Field of Classification Search
USPC ........... 134/2, 3, 10, 16, 17, 22.1, 22.19, 41; 216/96; 75/711, 721, 722, 739, 741
See application file for complete search history.

(56) References Cited

U.S. PATENT DOCUMENTS

| | | | |
|---|---|---|---|
| 4,731,113 A * | 3/1988 | Little | C01G 7/003 423/27 |
| 4,861,374 A | 8/1989 | Eriksson | |
| 5,320,665 A * | 6/1994 | Mullins | C22B 3/06 75/724 |
| 5,958,854 A | 9/1999 | Laing et al. | |
| 6,841,084 B2 * | 1/2005 | Lillie | C23F 1/28 216/100 |
| 2005/0148480 A1 | 7/2005 | Croce | |
| 2012/0152064 A1 * | 6/2012 | Ladi | C22B 3/44 75/743 |
| 2012/0227332 A1 | 9/2012 | Belnap et al. | |
| 2012/0228151 A1 * | 9/2012 | Moradi | C01G 7/00 205/571 |

OTHER PUBLICATIONS

P.N. Clark, et al. "Effect of Thiourea and some of its Derivatives on the Corrosion Behaviour. of Nickel in 50% v/v (5•6M) Hydrochloric Acid," British Corrosion Journal, vol. 14, No. 1, pp. 33-39(7), 1979.

E. Jackson, et al., "Enhanced Hydrochloric Acid Leaching of Cobalt" Minerals Engineering, vol. 12, No. 10, pp. 1201-1212, 1999.

Fan et al., "Factors Research on the Influence of Leaching Rate of Nickel and Cobalt from Waste Superalloys with Sulfuric Acid," International Journal of Nonferrous Metallurgy, 2013, vol. 2, pp. 63-67.

Notice of First Office Action, Chinese Application No. 201380080375.7, dated Dec. 27, 2016, 11 pages, Dec. 27, 2016.

Office Action, Chinese Application No. 201380080375.7, dated Jul. 14, 2017, 8 pages, Jul. 14, 2017.

Office Action, Canadian Application No. 2,929,474, dated Feb. 21, 2017, 5 pages, Feb. 21, 2017.

* cited by examiner

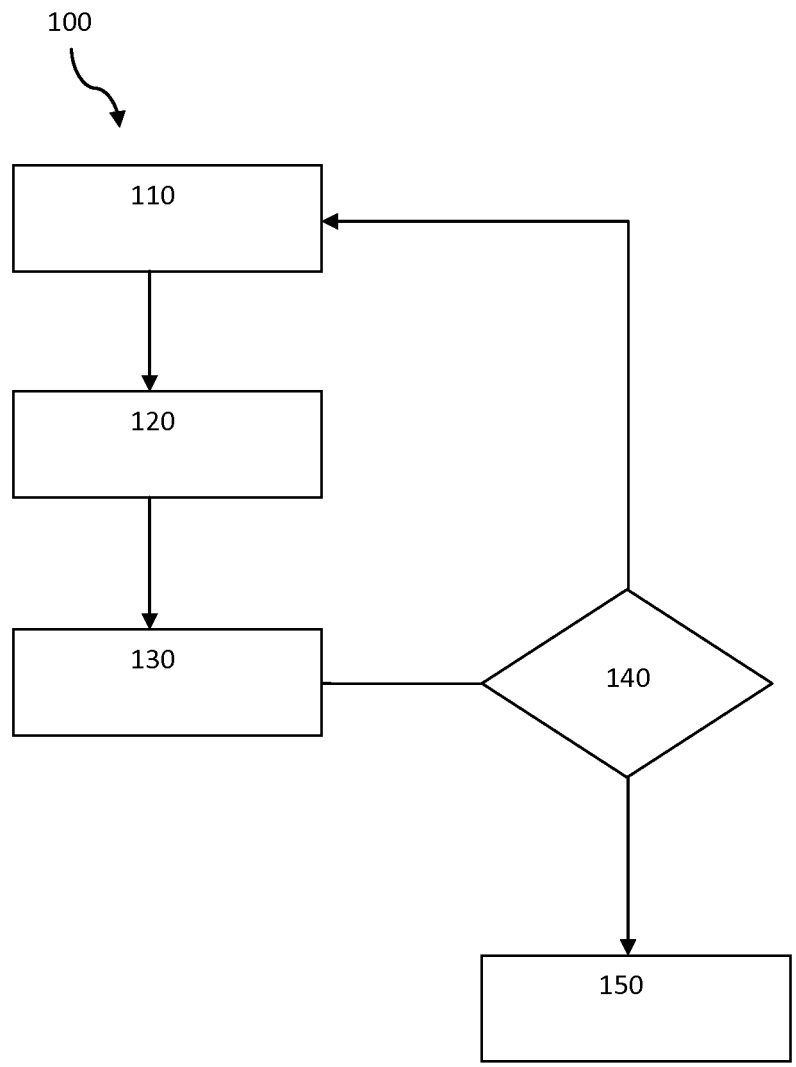

LEACHING ULTRAHARD MATERIALS BY ENHANCED DEMETALYZATION

RELATED APPLICATIONS

This application is a U.S. National Stage Application of International Application No. PCT/US2013/073868 filed Dec. 9, 2013, which designates the United States, and which is incorporated herein by reference in its entirety.

TECHNICAL FIELD

The present disclosure relates to methods for enhanced demetalyzation of an ultrahard material, such as polycrystalline diamond (PCD) or cubic boron nitride (CBN), using a thiourea solution.

BACKGROUND

Ultrahard materials, such as PCD and CBN, are useful in a variety of industrial applications, such as the drilling of rock formations. For example, PCD is commonly used in earth-boring drill bits in both petroleum extraction and mining operations. Ultrahard materials are particularly useful in such applications because they are extremely abrasion-resistant, and can withstand high temperatures and frequent impact with other hard materials, such as rock formations.

PCD is typically formed by subjecting diamond crystals to a high temperature high pressure (HTHP) sintering process in the presence of a catalyst material, such as a Group VIII metal or an alloy thereof. Cobalt, nickel and their alloys are particularly useful as catalysts during PCD formation. Similar catalyst-based processes may be used to form other ultrahard materials.

It can be beneficial to remove the catalyst from the PCD or other ultrahard material after the PCD is formed. Otherwise, differences in thermal conductance and thermal expansion between the catalyst and the ultrahard material can accelerate wear of the ultrahard material during use.

Various methods exist for removing catalyst from ultrahard materials, including so-called acid leaching and electrolytic processes.

BRIEF DESCRIPTION OF THE DRAWINGS

A more complete and thorough understanding of the present embodiments and advantages thereof may be acquired by referring to the following description taken in conjunction with the accompanying drawings, wherein:

FIG. 1 illustrates a method of enhanced demetalyzation according to an embodiment of the present disclosure.

DETAILED DESCRIPTION

The present disclosure relates to methods for enhanced demetalyzation of an ultrahard material, such as polycrystalline diamond (PCD) or cubic boron nitride (CBN), using a thiourea solution. Suitable applications for these methods include the removal of a target metal from the ultrahard material. The target metal may be a metal that interacts directly with thiourea to improve demetalyzation of the target metal from the ultrahard material or leaching of the target metal from the ultrahard material. The target metal may also be a metal that does not interact directly with the thiourea, but which is nevertheless leached more effectively from an ultrahard material due to direct interactions of another metal with thiourea.

The target metal may include metals or metal alloys. The target metal may include a catalyst material, such as cobalt, nickel, or combinations thereof used during the formation of the ultrahard material. The target metal may include a metal subsequently introduced into the ultrahard material after formation of the ultrahard material, such as a Group VIII metal or alloy thereof introduced during one or more additional HTHP processes following the HTHP process originally used to form the ultrahard material. The target metal may include another metal other than a Group VIII metal, such as copper.

Although the disclosure is discussed in the example context of PCD herein, one of ordinary skill in the art, applying the teachings with respect to PCD, could achieve similar enhanced demetalyzation of other ultrahard materials, such as CBN, by employing a thiourea solution in combination with leaching methods otherwise suitable for such ultrahard materials.

Process 100 of FIG. 1 illustrates a representative method for enhanced demetalyzation of PCD. In step 110, the PCD is placed in a thiourea solution. The PCD contains a target metal, such as a catalyst used during its formation or later introduced, such as a Group VIII metal or metal alloy. The target metal may be a cobalt (Co), a cobalt alloy, nickel (Ni), or a nickel alloy. The target metal may substantially lack iron (Fe) or an iron alloy. The target metal may be distributed in interstices of a diamond matrix.

If the PCD is attached to a material, such as a substrate, for example a tungsten carbide substrate, that may be damaged by leaching, the susceptible material may be protected prior to placement in the thiourea solution.

The thiourea solution may contain thiourea. As used herein, unless otherwise indicated by specific context, thiourea may include $(SC(NH_2)_2$ or substituted variations thereof. For example, thiourea may be represented by the structural formula:

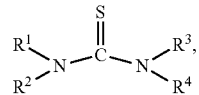

wherein $R^1$, $R^2$, $R^3$, and $R^4$ may independently be hydrogen (H) or a functional group containing carbon (C), nitrogen (N), oxygen (O), a halogen, sulfur (S), or phosphorus (P), such as an aklyl, an alkenyl, an alkynyl, a C-chain, such as a $C_{1-20}$, or a $C_{1-10}$ chain, an alcohol, an aldehyde, a carbonate, a carboxylate, carboxylic acid, an ester, an ether, a methoxy, a hydroperoxy, a peroxy, acetal, ketal, an acyl halide, an aryl, a phenyl, a benzyl, an amide, an amine, an imine, an imide, a cyanate, a nitrate, a nitrile, a nitrite, a nitro, a nitroso, a pyridyl, a haloalkane, a sulfide, a sulfinyl, a sulfonyl, a sulfinic acid, a thiocyanate, a carbonothioyl, or a phosphate group. R1, R2, R3 and R4 may also independently contain another thiol.

Functional groups may be selected for a variety of reasons, including, but not limited to, contribution to the enhanced demetalyzation effect, or facilitation or lack of inhibition of movement of the thiourea within the PCD.

Thiourea includes its tautomer:

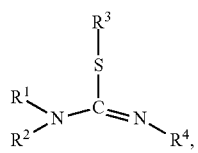

as well as other tautomers in which the placement of $R^1$, $R^2$, $R^3$, and $R^4$ may vary.

Mixtures of different thioureas may be used. In specific embodiments, the thiourea may be thiourea, methyl thiourea, ethyl thiourea, diisopropyl thiourea, phenyl thiourea, napthyl thiourea, o-tolyl thiourea, or di-o-tolyl thiourea.

The thiourea solution may further contain an acid suitable for leaching the target metal from the PCD. This acid may include an acid suitable for leaching in the absence of thioruea, or an acid only able to leach in the presence of thiourea. The acid may be a Bronstead acid ($H^+$ donors), such as hydrochloric acid (HCl), sulphuric acid ($H_2SO_4$), phosphoric acid ($H_3PO_4$), nitric acid ($HNO_3$), hydrobromic acid (HBr), perchloric acid ($HClO_4$), hydrofluoric acid (HF), and any combinations thereof.

The concentrations or acid and thiourea in the thiourea solution may be adjusted based on the specific acids and thioureas used as well as the intended process to be employed in step 120.

In general, acid concentrations otherwise suitable for PCD leaching may be used. For example, the total acid concentration may be between 1 M and 10 M. If desired, the acid concentration may be reduced as compared to leaching solutions lacking thiourea without resulting in a decrease in leaching rate or total amount of leaching achieved.

Thiourea concentrations may be on the order of $10^{-6}$ M to $10^{-1}$ M. For a given amount of acid, the enhanced demetalyzation effects of thiourea may begin to plateau at a higher thiourea concentrations.

Next, the PCD plus thiourea solution are subjected to a leaching process in step 120. This leaching process may take place under any of a variety of conditions, including conditions currently used for leaching. For example, leaching process 120 may be conducted at room temperature and atmospheric pressure. It may also be conducted at an elevated temperature, such as less than 100° C. and atmospheric pressure. If leaching process 120 is conducted at an elevated temperature at or above 100° C., then it may take place under elevated pressure. Leaching process 120 may also take place under elevated pressure at temperatures less than 100° C. Temperatures may be limited to those at which substantial thermal degradation of thiourea does not occur.

In a specific embodiment, leaching process 120 may take place under reflux conditions for at least one acid in the thiourea solution. Absent significant thiourea breakdown, in another embodiment, leaching process 120 may take place at a temperature between 90° C. and 350° C. and a pressure of between 5 bar to 345 bar.

Leaching process 120 may be carried out for a length of time predicted or known to result in a desired amount of target metal removal. In various embodiments, at least 70%, at least 85%, or at least 95% of the catalyst may be removed from the PCD or a specified portion of the PCD, such as its working surface. This may result in thermally stable polycrystalline diamond (TSP). In other embodiments, target metal may be removed to a certain depth from a surface, such as the working surface or a side surface, of the PCD. The amount of target metal removed to a certain depth in this embodiment may also be at least 70%, at least 85%, or at least 95%.

In a specific embodiment, the leaching process may be carried out for a period of between 48 hours and 3 months, more specifically between 80 hours and 500 hours.

Leaching process 120 may be carried out to achieve a desired amount of leaching in less time in the presence of the thiourea solution than it could be carried out in the presence of the acid components of the solution alone. In specific embodiments, it may be carried out in 5%, 10%, or 25% less time.

Without limiting the invention to a specific method of action, thiourea may enhance demetalyzation by reacting with the target metal in the PCD. In particular, the thiourea, or a breakdown product therefor formed in the presence of acid, may adsorb onto the surface of the target metal. There, it may form activated sites that are then more susceptible to reaction with acid. For example, thiourea may break down to release $H_2S$, which may become adsorbed on the target metal to create sites that are anodic as compared to the rest of the target metal surface. Other sulfur-rich breakdown products of thiourea may similarly be adsorbed on the surface of the target metal. The thiourea or breakdown product may be consumed by the interaction with the target metal, or it may be released when the target metal reacts with acid and may then be free to be adsorbed onto another portion of the target metal surface.

In some instances, adsorption of the thiourea or breakdown product onto the target metal surface may form a protective film. The acid components of the thiourea solution or the conditions of leaching process 120 may be selected such that the protective film is overcome and does not interfere with reaction of the acid and the target metal.

The overall leaching rate by the thiourea solution may result from a combination of a reaction-controlled demetalyzation process and a diffusion controlled process. The addition of thiourea may shift the removal rate towards a reaction-controlled process, which may speed up leaching.

In some embodiments, the thiourea solution may improve leaching of a target metal that thiourea does not directly interact with. For example, by improving demetalyzation of a metal that does interact with thiourea, the thiourea solution may leave free additional acid to react with the target metal and remove it from the PCD.

After the completion of leaching process 120, optional washing process 130 may be performed. In washing process 130, one or more components of the thiourea solution, such as the acid, or residual target metal or other metal may be partially or substantially removed from the PCD using a washing solution. The washing solution may contain an acid or combination of acids, such as any of the acids described above with respect to the thriourea solution. The washing solution may also contain thiourea. The washing solution may consist essentially of water.

After leaching process 120 or washing process 130, if performed, optional evaluation 140 may occur. During evaluation 140, the amount of leaching of the PCD may be assessed. Evaluation 140 may include non-destructive or destructive testing. If destructive testing is employed, then it may be performed only on a representative PCD unit taken from a plurality of units that were jointly subjected to steps 110 to 130.

Additionally, evaluation step 140 may be used to determine the appropriate thiourea solution and leaching conditions for a given type of PCD.

If evaluation step 140 is performed and the PCD is not appropriately leached, it may be returned to step 110.

If evaluation step 140 is performed and the PCD is appropriately leached, or if evaluation step 140 is omitted, optional step 150 may be performed, during which a target metal or other metal is recovered from the thiourea solution. Many metals, such as cobalt, are expensive and in high demand and may also be toxic. Accordingly, their recovery may be beneficial for a variety of reasons. Metals may typically be recovered by increasing the pH of the thiourea solution until the metal precipitates. For example, when using cobalt, adjustment to a pH of 7 or higher is usually sufficient to cause precipitation. Any residual thiourea or breakdown products will remain in solution or, if precipitated with the metal, will tend to form a coating on the metal that may be washed off or they may be otherwise readily removed by melting the metal.

Although the present disclosure and its advantages have been described in detail, it should be understood that various changes, substitutions and alternations can be made herein without departing from the spirit and scope of the disclosure as defined by the following claims.

The invention claimed is:

1. A method of removing a target metal from an ultrahard material, the method comprising:
exposing the ultrahard material to a thiourea solution comprising at least one thiourea and at least one acid for a time and under conditions sufficient to remove at least 70% of the target metal from at least a portion of the ultrahard material,
wherein the thiourea comprises:

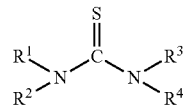

wherein at least one of $R^1$, $R^2$, $R^3$, and $R^4$ is a halogen, sulfur (S), or phosphorus (P).

2. The method of claim 1, wherein the ultrahard material comprises polycrystalline diamond (PCD).

3. The method of claim 1, wherein the target metal comprises a catalyst used during formation of the ultrahard material.

4. The method of claim 3, wherein the catalyst comprises a Group VIII metal or alloy thereof.

5. The method of claim 3, wherein the catalyst comprises cobalt, a cobalt alloy, nickel, a nickel alloy, or a combination thereof.

6. The method of claim 3, wherein the catalyst substantially lacks iron or an iron alloy.

7. The method of claim 1, wherein the thiourea solution comprises between $10^{-6}$ M and $10^{-1}$ M thiourea.

8. The method of claim 1, wherein the thiourea comprises a mixture of thioureas.

9. The method of claim 1, wherein the thiourea solution comprises between 1 M and 10 M acid.

10. The method of claim 1, wherein the acid comprises hydrochloric acid (HCl), sulphuric acid ($H_2SO_4$), phosphoric acid ($H_3PO_4$), nitric acid ($HNO_3$), hydrobromic acid (HBr), perchloric acid ($HClO_4$), or hydrofluoric acid (HF).

11. The method of claim 1, wherein the time is between 48 hours and 3 months.

12. The method of claim 1, wherein the time is between 80 hours and 500 hours.

13. The method of claim 1, wherein the conditions sufficient to remove at least 70% of the target metal from at least a portion of the ultrahard material comprise reflux conditions for at least one of the acids.

14. The method of claim 1, wherein the conditions sufficient to remove at least 70% of the target metal from at least a portion of the ultrahard material comprise room temperature and atmospheric pressure.

15. The method of claim 1, wherein the conditions sufficient to remove at least 70% of the target metal from at least a portion of the ultrahard material comprise a temperature of between 90° C. and 350° C.

16. The method of claim 1, wherein the conditions sufficient to remove at least 70% of the target metal from at least a portion of the ultrahard material comprise a pressure of between 5 bar to 345 bar.

17. The method of claim 1, further comprising washing the ultrahard material in a washing solution after exposure to the thiourea solution.

18. The method of claim 1, further comprising evaluating the ultrahard material after exposure to the thiourea solution to determine the amount of target metal remaining in at least a portion of the ultrahard material.

19. The method of claim 18, further comprising repeating the exposing step if more than 30% of the target metal remains in at least a portion of the ultrahard material.

20. The method of claim 1, wherein at least one of $R^1$, $R^2$, $R^3$, and $R^4$ is an aldehyde, a carbonate, a carboxylate, carboxylic acid, an ether, a methoxy, a hydroperoxy, a peroxy, an acetal, a ketal, an acyl halide, a benzyl, an amide, an imine, an imide, a cyanate, a nitrate, a nitrile, a nitrite, a nitro, a nitroso, a pyridyl, a haloalkane, a sulfide, a sulfinyl, a sulfonyl, a sulfinic acid, a thiocyanate, a carbonothioyl, a thiol, or a phosphate group.

* * * * *